April 7, 1936.   M. STEENBECK ET AL   2,036,307

DISCHARGE DEVICE CONTROL

Filed May 4, 1934

WITNESSES:

INVENTORS
Max Steenbeck and
Reinhold Wedel.
BY
ATTORNEY

Patented Apr. 7, 1936

2,036,307

UNITED STATES PATENT OFFICE 2,036,307

DISCHARGE DEVICE CONTROL

Max Steenbeck, Berlin-Siemensstadt, and Reinhold Wedel, Berlin-Haselhorst, Germany, assignors to Westinghouse Electric & Manufacturing Company, East Pittsburgh, Pa., a corporation of Pennsylvania Application May 4, 1934, Serial No. 723,922
In Germany May 12, 1933

4 Claims. (Cl. 250—27)

The invention relates generally to the control of electric circuits by means of electric discharge devices.

The object of the invention is to provide for controlling the flow of current in a circuit in which an electric discharge device is connected by changing the phase relation of the control potential of the discharge device relative to the principal potential.

It is also an object of the invention to provide for controlling the potential impressed on the control electrode of an electric discharge device to control the time of ignition of the discharge device.

The invention accordingly is disclosed in the accompanying drawing and comprises the combination of elements and arrangement of circuits which will be exemplified in the system hereinafter set forth and the scope of the application of which will be indicated in the appended claims.

For a fuller understanding of the nature and objects of the invention, reference may be had to the following detailed description taken in connection with the accompanying drawing, in which.

Figure 1:
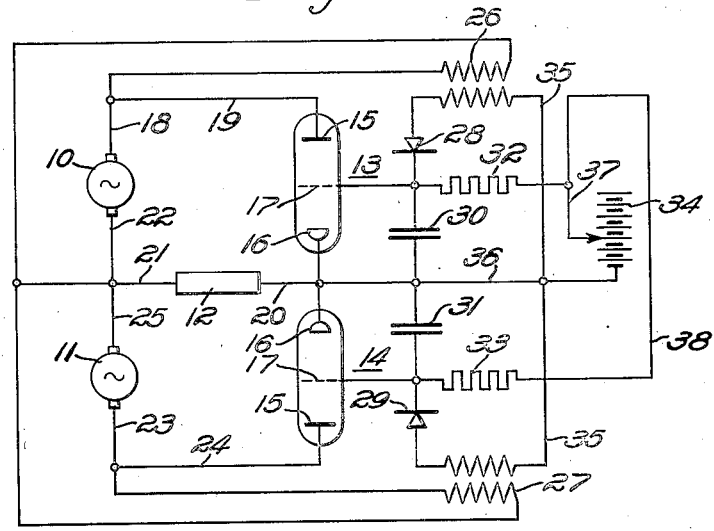
Figure 1 is a diagrammatic view of apparatus and circuits arranged in accordance with this invention.

Referring to the drawing, and to Fig. 1 in particular, two single-phase alternating current devices or dynamo-electric machines 10 and 11 are provided for supplying alternating current to a translating device 12. While two single-phase machines are illustrated a polyphase machine may be employed depending on the conditions to be met.

In order to control the flow of current through the translating device 12, two electric discharge devices 13 and 14 are provided. These electric discharge devices may be of any well known type, each having principal electrodes, that is, an anode 15, cathode 16 and a control electrode or grid 17. In the present embodiment of the invention the cathode is shown symbolically and represents any type of cathode. Thus a hot cathode or mercury pool cathode may be employed. If a mercury pool cathode is employed, a starting electrode of carborundum, boron carbide or the like which is immersed in the mercury may be substituted for the grid 17.

In connecting the electric discharge devices 13 and 14 into the system, the cathodes 16 are electrically connected to one another and to one terminal of the translating device 12 while the anodes are connected to the single-phase machines 10 and 11, thus providing two closed circuits. The upper circuit extends from the single-phase device 10 through conductors 18 and 19, the electric discharge device 13, conductor 20, the translating device 12 and conductors 21 and 22 back to the other terminal of the single-phase device 10. The lower circuit extends from the single-phase machine 11 through conductors 23 and 24, the electric discharge device 14, conductor 20, translating device 12 and conductors 21 and 25 back to the other terminal of single-phase machine 15.

As is well known, current flows only in one direction through electric discharge devices such as 13 and 14, the direction of flow being from the anode to the cathode. Therefore, in each of the circuits traced because of the characteristics of the discharge devices, current will flow for only part of each cycle.

In electric discharge devices containing a gas or in which a vapor is produced by an electric discharge an ionization of the gas or vapor is effected upon ignition which neutralizes the negative space current and a large current may pass through the tube with a small potential drop.

In such tubes the initial breakdown or ignition may be controlled by imposing a predetermined negative potential on the grid relative to the cathode but once discharge is started the flow of current cannot be interrupted or controlled by the voltage impressed on the grid until the end of the cycle when the current decreases to zero.

In the present system, in order to provide for impressing a potential on the control electrodes 17 which is negative relative to corresponding cathodes, two transformers 26 and 27 are provided which are connected across the single-phase machines 10 and 11, respectively. As shown, the secondary of each of the transformers 26 and 27 is connected across the cathode and grid of the corresponding electric discharge device. Rectifiers 28 and 29 are connected between each transformer and its corresponding control electrode.

Two capacitors 30 and 31 are connected to the control electrodes 17 of the electric discharge devices 13 and 14, respectively. These capacitors are also connected to one another and cooperate in charging the electrodes 17 of the discharge devices.

The circuit for impressing a potential on the control electrodes 17 of the electric discharge device 13 which is negative relative to the cathode extends from the positive terminal of the transformer 26, through conductors 35 and 36, capacitor 30, and rectifier 28 to the negative terminal of the transformer. When the capacitor is charged, it maintains a potential on the control electrode 17 which is negative relative to the corresponding cathode 16. The charging circuit for impressing a potential on the control electrode 17 of the electric discharge device 14 which is negative to the corresponding cathode 16 may be traced from the positive terminal of the secondary of transformer 27 through conductors 35 and 36, capacitor 31 and rectifier 29 to the other terminal of the transformer 27. The capacitor 31 cooperates in imposing a potential on the control electrode.

The rectifiers 28 and 29 are so arranged between the transformers 26 and 27, respectively, and their corresponding control grids 17 that only negative potentials are impressed upon the latter. When predetermined potentials are impressed upon the control electrodes 17, which are negative to the cathode 16, a flow of current through the electric discharge devices is prevented.

In order to control the potentials impressed on the electrodes 17, resistors 32 and 33 are electrically connected to the capacitors 30 and 31, respectively, and the direct-current source which in this instance is a storage battery 34 and is connected across the cathode and control electrode of each discharge device. The resistors 32 and 33 will be designed to meet the operating conditions of the system. As illustrated, the positive terminal of the battery is connected to the resistors 32 and 33. Further the battery is so arranged that the potential impressed on the resistors may be varied at will.

The circuit for the capacitor 30 extends from the positive terminal of battery 34 through resistor 32, capacitor 30, conductor 36 to the negative terminal of the battery. The circuit for the capacitor 31 may be traced from the positive terminal of the battery 34 through conductor 38, resistor 33, capacitor 31 and conductor 36 to the negative terminal of the battery. The capacitors cooperate in controlling the potentials between the cathodes and control electrodes of the electric discharge devices.

Figure 3:
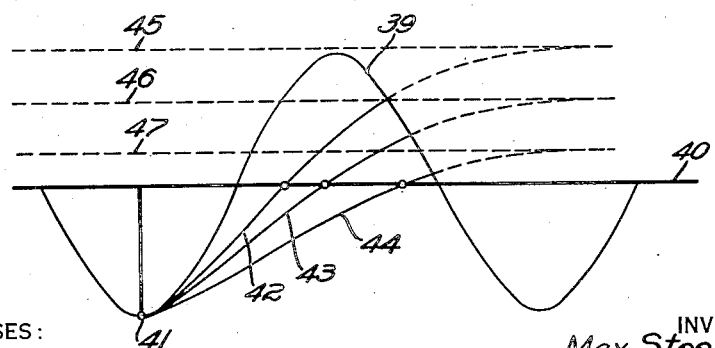
Fig. 3 is a series of curves prepared to illustrate the functioning of the invention.

The operation of the system may best be explained by first considering the curves shown in Fig. 3. The curve 39 represents the alternating current potential applied to one of the anodes relative to the corresponding cathode of the electric discharge devices of the system drawn with reference to a base line 40. The point 41 corresponds to the maximum negative potential applied to a control grid relative to a cathode. The different voltage values of the battery 34 impressed across the condensers 30 and 31 are represented by the lines 45, 46 and 47. The curves 42 to 44, inclusive, all start from the point 41 which is the maximum negative value of the grid voltages and increase according to a predetermined fixed time law. The curves 42 to 44, inclusive, approach their corresponding voltage lines asymptotically.

As shown, these curves 42 to 44, inclusive, intersect the base line and these points of intersection represent the ignition point for the electric discharge devices when the battery 34 is adjusted to the different voltage values. In this manner the phase relation of the control and principal potentials are varied. Further, the system may be so arranged that the ignition point will not fall on the base line 40.

In the system illustrated in Fig. 1, when the transformers 26 and 27 are energized during the negative half wave which traverses the rectifiers 28 and 29, the capacitors 30 and 31 are charged. The control grids 17 of the electric discharge devices 13 and 14 will also receive a negative charge. Since these negative charges are with respect to the cathodes 16 of the corresponding devices, no current will flow through the discharge devices.

The capacitors 30 and 31 and the battery 34 cooperate in the impressing of potentials on the control electrodes 17. The imposing of potentials on the control electrodes takes place through the resistors 32 and 33. The steepness of the wave front of the grid potential curves 42 to 44, inclusive, will depend upon the value of the potential of the adjustable power source which in Fig. 1 is illustrated as a direct current battery 34. The ignition of the discharge devices depends on the time required to charge the capacitors, which control the negative potential on the control electrodes during the negative half of the power cycle. Therefore, in this manner the discharge devices 13 and 14 may be controlled by adjusting a single device, the battery 34, to impress different potentials across the capacitors 30 and 31.

Figure 2:
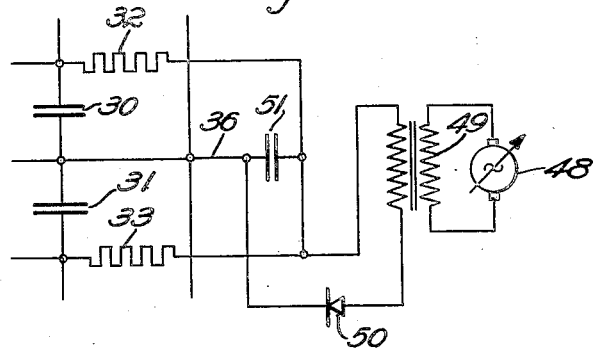
Fig. 2 is a diagrammatic view of a modification of the system illustrated in Fig. 1.

The modification illustrated in Fig. 2 is generally the same as that shown in Fig. 1 instead of the direct current battery 34 an alternating current generator or other alternating current source of power 48 is employed. The alternating current source of power 48 is connected through a transformer 49 across the resistors 32 and 33. A rectifier 50 is interposed between one terminal of the secondary of the transformer 49 and the conductor 36 and a capacitor 51 is connected between the transformer and the resistors 32 and 33. The functioning of the system is the same as that described for the system shown in Fig. 1.

In conclusion, it is pointed out that while the illustrated example constitutes a practical embodiment of the invention, it is not intended that the invention be limited to the exact details shown, since modifications of the same may be considerably varied without departing from the spirit of the invention as defined in the appended claims.

We claim as our invention:

1. In a control system for electric circuits, in combination, a multiple phase alternating-current power source, a translating device connected to the power source, an electric-discharge device connected across each phase of the power source, each electric-discharge device being provided with a cathode and a control electrode, means for imposing a negative charge on the control electrodes relative to the cathodes to control the flow of current through the discharge devices, resistors connected to the control electrodes of the discharge devices, and a variable direct-current power source connected across the cathode and control electrode of each discharge device to control the time of ignition of the discharge devices.

2. In a control system for electric circuits, in combination, a multiple phase alternating-current power source, a translating device connected to the power source, a discharge device connected across each phase power source, each discharge device being provided with a cathode and a control electrode, means for imposing negative charges on the control electrodes relative to the cathodes to control the flow of current through the discharge devices, rectifiers disposed between the power source and the discharge devices to control the imposing of a potential on the control electrodes, resistors for discharging the electrodes, and a variable direct-current power source connected in circuit relation with the resistors cooperative to control the potentials on the control electrodes to control the time of ignition of the discharge devices.

3. In a control system in combination an electric discharge device having a control electrode and a plurality of principal electrodes, said discharge device having the property of asymmetric conductivity, means for impressing a pulsating potential between said principal electrodes, certain of the pulsations of said potential being of such polarity that said discharge device is non-conductive to them, a capacitor coupled between said control electrode and one of said principal electrodes, a source of pulsating potential for charging said capacitor, said source having a predetermined phase-relationship to the potential impressed between said principal electrodes, means, in circuit with said source and said capacitor, for limiting the pulsations of potential whereby said capacitor is charged to those only which occur substantially during the intervals during which pulsations of potentials to which said discharge device is non-conductive are impressed between said principal electrodes, and means, including a source of potential variable from a minimum value to a maximum value in a plurality of steps, for varying the charge on said capacitor.

4. In a control system in combination an electric discharge device having a control electrode and a plurality of principal electrodes, said discharge device having the property of asymmetric conductivity, means for impressing a pulsating potential between said principal electrodes, certain of the pulsations of said potential being of such polarity that said discharge device is non-conductive to them, a capacitor coupled between said control electrode and one of said principal electrodes, a source of pulsating potential for charging said capacitor, said source having a predetermined phase-relationship to the potential impressed between said principal electrodes, means, in circuit with said source and said capacitor, for limiting the pulsations of potential whereby said capacitor may be charged to those only which occur substantially during the intervals during which pulsations of potentials to which said discharge device is non-conductive are impressed between said principal electrodes, said means also having such impedance that said capacitor is charged to the maximum value possible for the magnitude of the pulsations during the course of a single pulsation, and means, including a source of potential variable from a minimum value to a maximum value in a plurality of steps, for varying the charge on said capacitor.

MAX STEENBECK.
REINHOLD WEDEL.